July 26, 1932.   R. C. MOORE   1,869,210
AUTOMATIC UNLOADER FOR DRIERS
Filed Feb. 16, 1929   2 Sheets-Sheet 1

Inventor
Richard C. Moore
Kurs Hudson & Kent
Attys

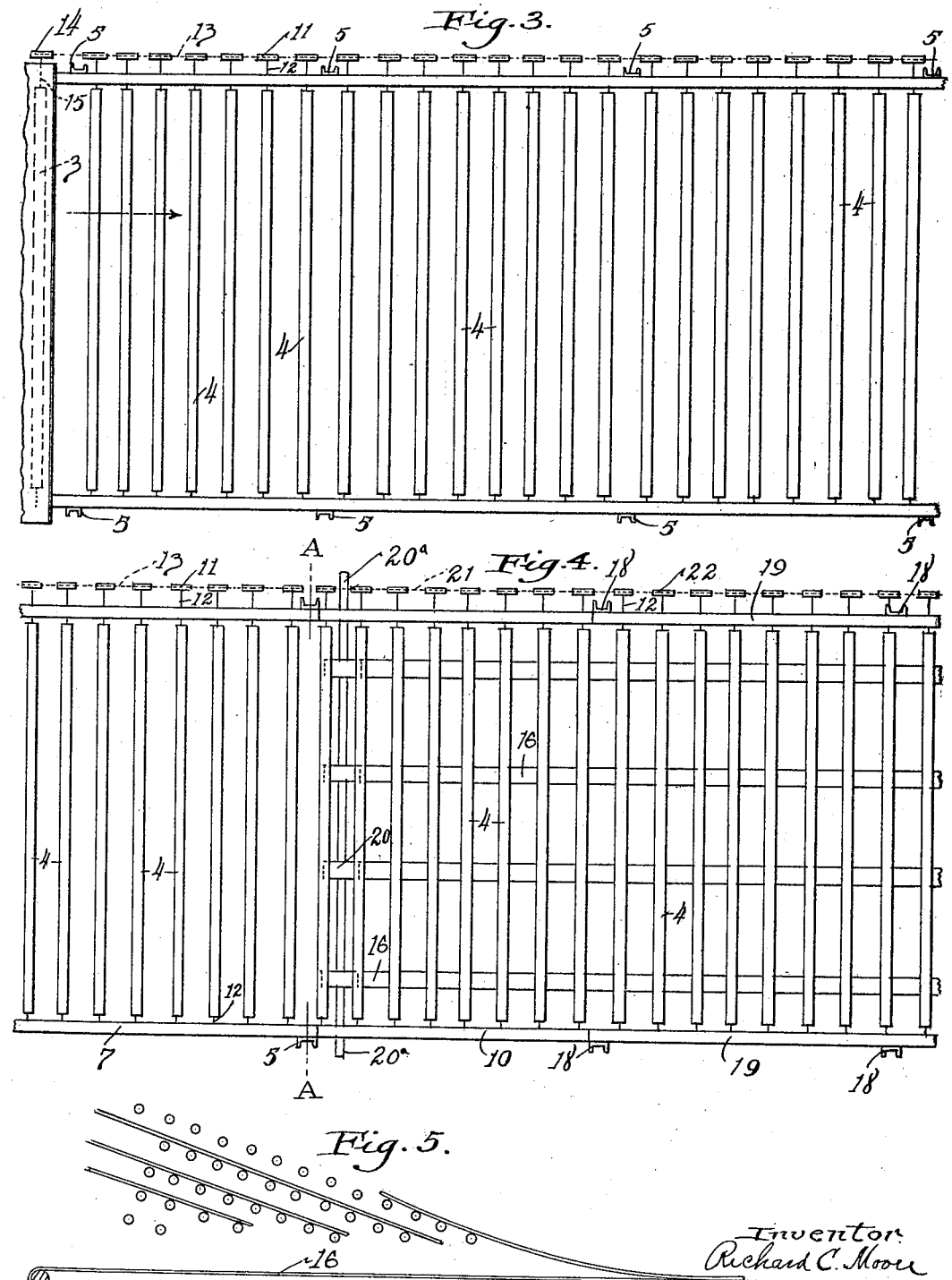

Patented July 26, 1932

1,869,210

UNITED STATES PATENT OFFICE

RICHARD C. MOORE, OF PAINESVILLE, OHIO, ASSIGNOR TO THE COE MANUFACTURING COMPANY, OF PAINESVILLE, OHIO, A CORPORATION OF OHIO

AUTOMATIC UNLOADER FOR DRIERS

Application filed February 16, 1929. Serial No. 340,521.

This invention relates to an unloading device and has particular utility in connection with an apparatus wherein one or more decks of horizontal conveyors carry the articles or material constituting the work through the apparatus, during which time certain operative steps are performed thereon.

In order to clearly set forth the nature of the invention, the same will be described herein, by way of example, as applied to a drier for wall boards, veneers and similar materials, although it should be understood that this is by no means its only application, since it might be used in connection with a wide variety of apparatus of the general character set forth above.

An object of the invention is to provide an unloading device for use with an apparatus, such as specified above, which eliminates manual handling of the finished work and thus cheapens cost of production, is of simple and inexpensive design and capable of economic operation.

A more specific object is to provide an automatic unloading device for use with an apparatus, such as specified above, which is capable of receiving the work from one or more decks of conveyors within the apparatus and depositing the same upon a transfer or conveyor belt in substantially the same sequence or succession that the work passes through the apparatus.

A further object is to provide an unloading device for use in connection with a drier having therein a plurality of horizontal conveyors arranged in a series of vertically spaced decks and upon which the material is conveyed through the drier, which will receive the material from the various decks of conveyors at the discharge end of the drier and deposit the same in the proper succession or sequence upon a conveyor or transfer belt, eliminating piling of the sheets of material upon one another and the manual handling thereof.

Additional objects and advantages will become apparent as the detailed description of the invention proceeds.

In the accompanying drawings,

Fig. 3 is a top plan view of the portion of the unloading device shown in Fig. 1;

Fig. 4 is a top plan view of that portion of the device shown in Fig. 2; and

Fig. 5 is a diagrammatic illustration showing the relation of some of the conveyor rolls of the device with respect to the conveyor or transfer belt upon which the device discharges the material or articles constituting the work.

Figure 1:
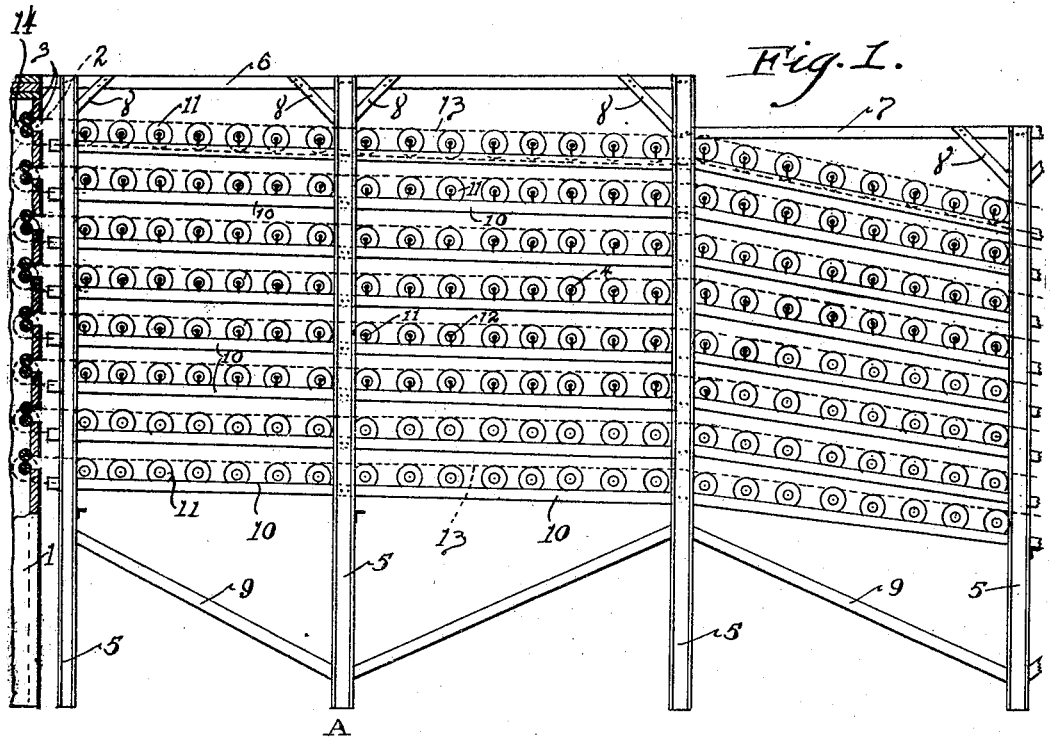
Fig. 1 is a side elevational view of a portion of the unloading device, showing the same applied to the discharge end of a drier, certain portions of the drier wall being broken away and shown in section.

As previously stated, the device will be described herein as applied to the discharge end 1 of a progressive drier adapted to dry wall boards, veneers or similar material. This application of the device to a specific apparatus is merely for the purpose of illustrating one of its uses and it should be understood that it is not to be limited to such use. The progressive drier comprises an insulated relatively elongated housing or drying chamber provided with means for applying heat and for circulating air or other gaseous drying medium through the same. In order to move the material through the drier, the same is provided with a plurality of vertically spaced decks of horizontal roller conveyors, while suitable slots are provided adjacent each deck of roller conveyors at the entrance end of the drier through which the material passes into the same. There are also suitable slots 2 arranged adjacent each deck of roller conveyors, such conveyors being indicated at 3 in Fig. 1, at the discharge end 1 of the drier through which the dried material can pass or be discharged from the drier. Ordinarily the wet boards or material are delivered from a suitable feeding means, such as a conveyor belt to the driven belts of a tipple, which is raised and lowered, so as to line up with the various decks of roller conveyors in succession. The tipple feeds the material to a series of driven rollers which support and carry them forward into the drier. The heat within the drier is applied above and below the boards, as they move therethrough on the various decks of roller conveyors and a circulation of the drying medium within the drier is properly maintained by a system of ducts and fans. After passing through the drier, the material enters an open cooling section, the purpose of which is to reduce the temperature thereof. Heretofore, the boards have been dragged manually from the discharge or cooling section and either placed in piles or on trim saws for dry sizing, according to the nature of the material being dried.

The unloading device constituting the present invention when used in connection with the discharge end of the drier, such as has been set forth, may have a portion thereof serving the same function as the cooling section in the ordinary form of drier. The unloading device is made up of a plurality of decks of roller conveyors 4, the number of such decks corresponding to the number of decks of roller conveyors in the drier and operatively aligning, respectively, with the various decks of conveyors at the discharge end of the drier, so that the material as it passes through the slots 2 in the discharge end of the drier will be received by the various roller conveyors 4 of the unloader.

Figure 2:
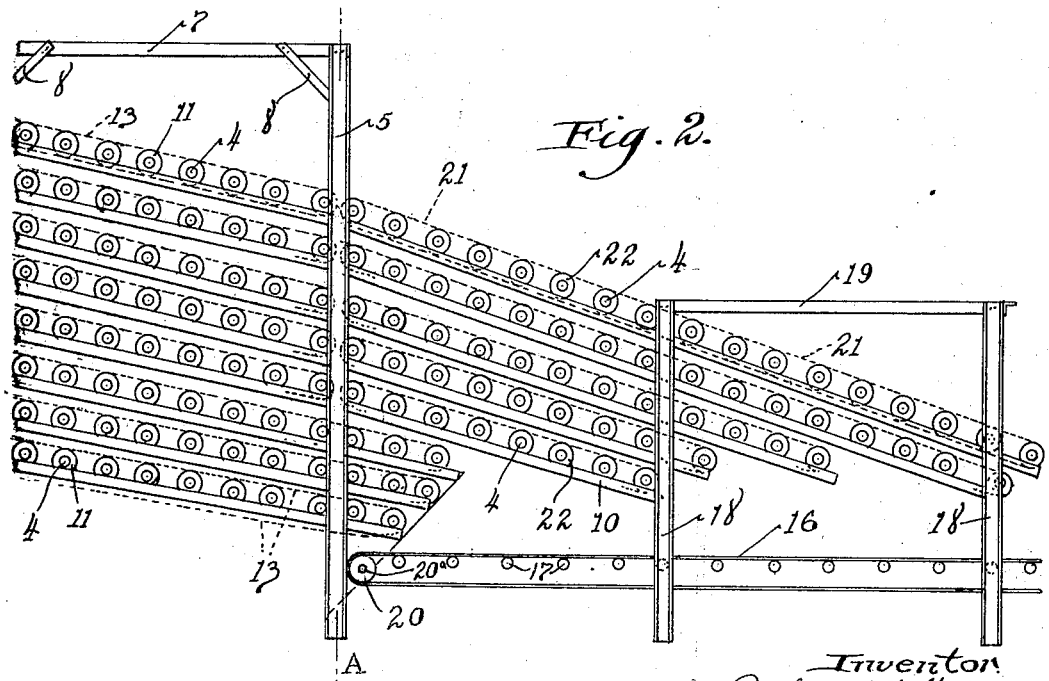
Fig. 2 is also a side elevational view of a portion of the unloading device, the portion shown therein when combined with the portion shown in Fig. 1 constituting the entire device.

While the mechanical construction of the unloading device may vary as to form and has only been shown in somewhat diagrammatic form, it is proposed to support the roller conveyors 4 by means of an unenclosed framework connected to the discharge end of the drier and extending in longitudinal prolongation thereof. This framework may consist of vertical channel members 5, the two outer members being shorter than the others, connected at their upper ends by suitable horizontal headers 6 and 7, while bracing members 8 extend diagonally from the headers to the vertical members 5, the latter being also braced adjacent their lower ends by bracing members 9. The vertical channel members 5 of the unenclosed frame of the unloading device are connected intermediate their ends on each side of the device by supporting angle members 10 suitably spaced vertically of each other and provided with aligned bearing supports (indicated diagrammatically) for the opposite ends of the shafts 12 for the roller conveyors 4. Of course, it is obvious that the number of the members 10 on each side of the unloader will correspond to the number of decks of roller conveyors in the unloading device and that the position of these members will be such that the roller conveyors 4 will be supported thereby in the proper operative position for receiving the material from the conveyors in the drier. From the discharge end of the drier to the point indicated by line A—A in Figs. 2 and 4, the supports 10 and the decks of roller conveyors 4 supported thereby are curved downwardly on a radius which will permit the sheets of material to follow the curvature thereof and are rotated at the same speed of rotation as are the rollers of the conveyors in the drier.

A simple manner of obtaining the desired rotation of the rollers 4 up to the point A—A is to provide sprockets 11 on one end of the shafts 12 upon which the rollers 4 are mounted, which sprockets engage with endless chains 13 extending around sprockets 14 arranged on the corresponding ends of the shafts 15 which carry the rollers 3 in the drier. The sheets of material, as they are propelled through the various openings 2 in the drier wall pass onto the rollers 4 and are carried along the various decks of such roller conveyors up to the point indicated by line A—A in Figs. 2 and 4 at the same speed and in the same succession as they pass through the drier. As previously stated, the decks of roller conveyors 4 are curved downwardly on such a radius that the sheets of material may easily follow the curvature, thus the ends of each deck of roller conveyors adjacent the point A—A are substantially lower than are the ends of such decks adjacent the discharge end of the drier. From the point A—A onward, the decks of roller conveyors extend downwardly at the same, or possibly a greater inclination or curvature if the material may follow the same, toward conveyor belts 16 which are supported upon a plurality of transversely extending idler rollers 17, in turn, carried by a suitable framework including vertical channel members 18, connected at their upper ends by a horizontal member 19, certain of the upper angle members 10 being secured to and supported by the channels 18 adjacent the outer ends of the members 10. The belts 16 pass over rotating pulleys 20 carried on shafts 20a arranged at opposite ends of the belts, only one of such pulleys being shown in the drawings, and are for the purpose of conveying the sheets of material to a storage or shipping point or to trim saws for dry sizing.

Of course, the upper decks of roller conveyors 4 will extend further outwardly over the conveyors 16 than the succeeding decks since the curvature or inclination of the various decks will naturally bring the lowermost deck to a point nearest the conveyor belts 16 before the upper decks have reached the proper point from which the material may pass therefrom onto the belts. However, the uppermost deck should terminate above the conveyor belts at a height not too great to permit of the easy passage of the sheets of material therefrom onto the belts.

The rollers 4 from the point A—A to the end of the unloading device are preferably driven at a speed much greater than the speed of the roller conveyors in the drier and the unloading device up to the point A—A, while the conveyor belts are driven at the same speed as the rollers 4 from the point A—A outwardly. It is necessary, therefore, to have a separate driving means for these rollers, which means consists of a chain 21 driven independently of the chain 13 and passing around sprockets 22 arranged upon the ends of the shaft 12 supporting the rollers 4 in this group, the chain 21 also, of course, passing around a sprocket connected with a suitable driving means, not shown. Of course, the conveyor belts 16 may be suitably connected with the driving mechanism for the chain 21 so that these belts will be operated at the same speed with the fast rollers 4 or they may be independently driven at the required speed.

Ordinarily, the sheets of material are fed to the various decks of conveyors in the drier in succession so that they will emerge in a corresponding manner at the discharge end thereof. Since the rollers 4 of the unloading device are travelling at the same speed as are the rollers in the drier up to the point A—A of the unloading device, it is apparent that the sheets of material will reach such point A—A in the same succession. Ordinarily, the sheets of material will arrive at the point A—A in such manner that the leading edge of the successive sheets on the different decks from the top downwardly will arrive at such point before the leading edge of the sheet following by a suitable horizontal distance, generally approximating the length of the sheet divided by the number of decks. Therefore, it is desirable, in order to maintain this order of succession and to insure that the sheets will be deposited from the various decks onto the conveyor belts 16 in the proper sequence, to operate the rollers 4 from the point A—A onward at a speed substantially greater than the speed of the slow rollers 4, a suitable speed being twice the speed of the rollers in the drier times the number of decks. In the present illustration, this will mean that the rollers 4 from the point A—A onward rotate at sixteen times the speed of the drier rollers, although it should be understood that this ratio may be suitably varied for different conditions and materials. Therefore, as soon as a sheet of material on any of the decks has been carried forward onto the fast moving rollers of the unloading device, such sheets will immediately travel at the higher speed, which speed is sufficient to cause the sheets to be discharged onto the conveyor belt in the proper sequence without any of the sheets overlapping other sheets. In the handling of certain classes of material, this is most important since the sheets should not be piled one upon another. Certain of the decks of fast rollers 4 are diagrammatically shown in Fig. 5, the sheets of material being shown therein in substantially the relative positions they will occupy as they approach the point of their discharge upon the conveyor belts 16. Of course, the conveyor belts 16 will convey the sheets deposited thereon to a distant point for whatever disposition is to be made thereof.

While the rollers 4 from the point A—A onward have been described as positively driven, it is obvious that these rollers could be idlers and that the sheets of material would automatically accelerate to the proper speed by the force of gravity.

Although a preferred form of the invention has been illustrated and described herein, it should be understood that the same is susceptible of various modifications and adaptations within the scope of the appended claims.

Having thus described my invention, I claim:

1. An unloading device adapted to be arranged at the discharge end of a multiple deck drier through which the pieces of work move in continuous succession respectively on a plurality of vertically spaced horizontal conveyors comprising, means adjacent each deck for receiving the work from each conveyor and conveying the same away from the drier in continuous succession at substantially the same speed that the work moves therethrough, and mechanical means for receiving the work from the said first named means and conveying it away from the same at a substantially increased speed.

2. An unloading device adapted to be arranged at the discharge end of a multiple deck drier through which the pieces of work move in continuous succession respectively on a plurality of vertically spaced horizontal conveyors comprising, means adjacent each deck for receiving the work from each conveyor and conveying the same away from the drier in continuous succession at substantially the same speed that the work moves therethrough, and means for receiving the work from the said first named means and conveying it to another conveyor at a substantially increased speed.

3. An unloading device adapted to be arranged at the discharge end of a multiple deck drier through which the pieces of work move in continuous succession respectively on a plurality of vertically spaced horizontally arranged conveyors comprising, means adjacent each deck for receiving the work from each conveyor and conveying the same away from the drier in continuous succession at substantially the same speed that the work moves therethrough, and means for receiving the work from said first means and conveying the same downwardly at a substantially increased speed to another conveyor moving at the same speed as said last named means.

4. An unloading device adapted to be arranged at the discharge end of a multiple deck drier through which the pieces of work move in succession respectively on a plurality of vertically spaced horizontal conveyors comprising, a plurality of conveyors extending outwardly from the discharge end of the drier, each conveyor of which operatively aligns with a corresponding conveyor in the drier, said plurality of outwardly extending conveyors each being curved downwardly and having portions thereof operated at different speeds.

5. An unloading device adapted to be arranged at the discharge end of a multiple deck drier through which the pieces of work move in succession respectively on a plurality of vertically spaced horizontal conveyors comprising, a plurality of conveyors extending outwardly from the discharge end of the drier, each conveyor of which operatively aligns with a corresponding conveyor in the drier, said plurality of outwardly extending conveyors each being curved downwardly and having one portion thereof operated at the same speed as the conveyors in the drier and another portion thereof at a substantially increased speed.

6. An unloading device adapted to be arranged at the discharge end of a multiple deck drier through which the pieces of work move in succession respectively on a plurality of vertically spaced horizontal conveyors comprising, a plurality of conveyors extending outwardly from the discharge end of the drier, said plurality of outwardly extending conveyors each operatively aligning with a corresponding conveyor in the drier and being curved downwardly and having a portion adjacent the apparatus operated at the same speed with the conveyors therein and a portion outwardly of the drier operated at a substantially increased speed.

7. An unloading device adapted to be arranged adjacent the discharge end of a multiple deck drier through which the pieces of work move in succession respectively on a plurality of vertically spaced horizontal conveyors comprising, a plurality of conveyors extending outwardly from the discharge end of the drier, each conveyor of which operatively aligns at one end with a corresponding conveyor in the drier, said plurality of outwardly extending conveyors each being curved downwardly whereby its outer end is lower than its inner end and having its outer portion operated at a substantially increased speed with respect to its inner portion, and a conveyor common to all of the last named conveyors arranged adjacent the outer ends thereof and operating at substantially the same speed as the outer portion of said plurality of outwardly extending conveyors.

8. In combination with a multiple deck drier through which the pieces of work move in succession respectively on a plurality of vertically spaced horizontal roller conveyors, an unloading device comprising a supporting frame extending in longitudinal prolongation of the drier from the discharge end thereof, a plurality of vertically spaced roller conveyors supported by said frame and curving outwardly and downwardly from the discharge end of the drier with each conveyor operatively aligning at its inner end with a conveyor in the drier, means for operating a portion of the rollers of each conveyor at the same speed as the rollers of the conveyors in the drier, and means for operating another portion of the rollers of each conveyor at a substantially increased speed.

9. In combination with a multiple deck drier through which the pieces of work move in succession respectively on a plurality of vertically spaced horizontal roller conveyors, an unloading device comprising a supporting frame extending in longitudinal prolongation of the drier from the discharge end thereof, a plurality of vertically spaced roller conveyors supported by said frame and curving outwardly and downwardly from the discharge end of the drier with each conveyor operatively aligning at its inner end with a conveyor in the drier, means for operating the rollers of a portion of each conveyor adjacent the drier at substantially the same speed as the rollers in the drier, means for operating the rollers of the outer portion of each conveyor at a substantially increased speed, and a horizontally extending conveyor arranged beneath the outer and lower end of each of the conveyors and adapted to be operated at substantially the same speed as the rollers of the outer portion thereof.

In testimony whereof, I hereunto affix my signature.

RICHARD C. MOORE.